(12) United States Patent
Ebihara et al.

(10) Patent No.: US 8,353,725 B2
(45) Date of Patent: Jan. 15, 2013

(54) CONTACT AND CONNECTION UNIT PROVIDED WITH THE CONTACT

(75) Inventors: Hiroyuki Ebihara, Tokyo (JP); Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 195 days.

(21) Appl. No.: 12/869,789

(22) Filed: Aug. 27, 2010

(65) Prior Publication Data

US 2011/0081808 A1 Apr. 7, 2011

(30) Foreign Application Priority Data

Oct. 7, 2009 (JP) ................................ 2009-233060

(51) Int. Cl.
*H01R 4/18* (2006.01)
(52) U.S. Cl. ...................................................... 439/626
(58) Field of Classification Search .................. 439/884, 439/877, 626, 682, 850, 404, 402, 709, 535; 174/260
See application file for complete search history.

(56) References Cited

U.S. PATENT DOCUMENTS

| | | | | |
|---|---|---|---|---|
| 4,113,341 A | * | 9/1978 | Hughes ..................... | 439/620.21 |
| 4,428,633 A | * | 1/1984 | Lundergan et al. ............. | 439/70 |
| 4,460,232 A | * | 7/1984 | Sotolongo ..................... | 439/535 |
| 4,822,299 A | * | 4/1989 | Rider, Jr. ........................ | 439/402 |
| 4,952,169 A | * | 8/1990 | Hayes, Sr. ...................... | 439/403 |
| 5,769,672 A | * | 6/1998 | Flieger .......................... | 439/850 |
| 6,655,987 B2 | * | 12/2003 | Higashikozono et al. .... | 439/535 |
| 7,097,516 B2 | * | 8/2006 | Werner et al. ................. | 439/709 |
| 7,444,743 B2 | * | 11/2008 | Feldmeier et al. .............. | 29/748 |
| 7,591,690 B1 | * | 9/2009 | Chien et al. ................... | 439/709 |
| 7,695,306 B2 | * | 4/2010 | Chiba .......................... | 439/404 |
| 7,988,486 B1 | * | 8/2011 | Lin ............................... | 439/527 |
| 8,128,439 B2 | * | 3/2012 | Feldmeier et al. ............ | 439/709 |
| 2005/0054244 A1 | * | 3/2005 | Werner et al. ................. | 439/682 |
| 2006/0283628 A1 | * | 12/2006 | Feldmeier et al. ............ | 174/260 |
| 2010/0139760 A1 | * | 6/2010 | Giefers ......................... | 136/256 |

FOREIGN PATENT DOCUMENTS

JP 2002-359389 A 12/2002

* cited by examiner

*Primary Examiner* — Alexander Gilman

(74) *Attorney, Agent, or Firm* — Holtz, Holtz, Goodman & Chick, PC

(57) ABSTRACT

A contact which makes it possible to make a connection unit compact in size. A pair of supporting portions opposed to each other in a predetermined direction are provided on opposite side edges of a plate-shaped base portion with which an associated one of electrodes of a photovoltaic unit is brought into contact, such that the supporting portions rise from the opposite side edges, respectively. The pair of supporting portions are each formed with a slit for supporting a terminal portion of a diode.

14 Claims, 15 Drawing Sheets

CONTACT AND CONNECTION UNIT
PROVIDED WITH THE CONTACT

BACKGROUND OF THE INVENTION

1. Field of the Invention

This invention relates to a contact and a connection unit provided with the contact.

2. Description of the Related Art

Conventionally, there has been proposed a photovoltaic module wiring terminal box (connection unit) including a terminal box and a plurality of terminal strips (contacts) (see Japanese Laid-Open Patent Publication (Kokai) No. 2002-359389 (Paragraphs 0014 to 0016, and FIG. 6)).

The terminal box comprises a box body made of an ABS resin and a cover made of an ABS resin. The box body has a box shape that opens upward. The cover is fitted to the top of the box body via a gasket to cover the opening of the box body.

The terminal strips are provided such that each three terminal strips are integrally formed as one set, and each terminal strip has a base piece and a folded-back piece. A protruding piece is continuous with one end of the base piece. The protruding piece is substantially at right angles to the base piece. The base piece has a rising piece formed on a central portion thereof. The rising piece extends substantially at right angles to the base piece. A foremost end of the rising piece is folded back. The aforementioned folded-back piece has one end continuous with the other end of the base piece, and is inclined with respect to the base piece at an angle of approximately 45°. The folded-back piece is formed with a latching hole for receiving the foremost end of the rising piece. Further, the other end of the folded-back piece is formed with a protruding piece which is brought into abutment with the protruding piece formed on the one end of the base piece. The terminal strips are arranged within the box body.

To connect a terminal leg of a bypass diode (electronic component) or an electrode (contact portion) of a photovoltaic module (object to be connected) to one of the terminal strips, the terminal leg of the bypass diode or the electrode of the photovoltaic module is put in a cutout formed in the one end of the base piece, when the terminal strip is in a state where the foremost end of the rising piece is not inserted through the latching hole of the folded-back piece. Then, the other end of the folded-back piece is pressed toward the base piece, whereby the terminal leg or the electrode is sandwiched by the protruding piece of the folded-back piece and the protruding piece of the base piece. At this time, the foremost end of the rising piece is relatively inserted through the latching hole of the folded-back piece, whereby the foremost end of the rising piece is hooked on a rim of the latching hole of the folded-back piece, which fixes the folded-back piece. The bypass diode or the photovoltaic module is thus connected to the terminal strips.

In the above-mentioned photovoltaic module wiring terminal box, since three terminal strips are integrated into one set of terminal strips, to connect one terminal leg of the bypass diode, the one set of terminal strips is required. The one set of terminal strips has a width considerably larger than that of the terminal leg of the bypass diode. Therefore, to connect a plurality of bypass diodes, it is required to arrange a plurality of sets of terminal strips in a direction of the width thereof, which results in an increased width dimension of the photovoltaic module wiring terminal box.

SUMMARY OF THE INVENTION

The present invention has been made in view of these circumstances, and an object thereof is to provide a contact which makes it possible to make a connection unit compact in size.

To attain the above object, in a first aspect of the present invention, there is provided a contact comprising a base portion having a plate-like shape, with which a contact portion of an object to be connected is brought into contact, and a pair of supporting portions that are provided on opposite side edges of the base portion in a manner rising therefrom, respectively, and are opposed to each other in a predetermined direction, the pair of supporting portions each having a slit formed therein for supporting a terminal portion of an electronic component.

With the arrangement of the contact according to the first aspect of the present invention, the contact comprises the plate-shaped base portion with which the contact portion of the object to be connected is brought into contact, and the pair of supporting portions that are provided on the opposite side edges of the base portion in a manner rising therefrom and are opposed to each other in the predetermined direction. The supporting portions support the terminal portions of the electronic component by the slits respectively formed in the pair of supporting portions. Therefore, it is possible to reduce the width of the contact.

Preferably, the contact comprises a pressing portion that is provided in a manner opposed to the base portion, and is elastically deformed toward the base portion to thereby press the contact portion against the base portion, a linking portion that links one end of the base portion and one end of the pressing portion, and engaging portions with which the other end of the pressing portion is engaged when the pressing portion is elastically deformed toward the base portion, to thereby cause the pressing portion to maintain the deformed state thereof, and wherein the pressing portion is bent such that an intermediate portion thereof is brought into contact with the contact portion on the base portion when the pressing portion is elastically deformed toward the base portion, and wherein the pressing portion is divided along a direction orthogonal to the predetermined direction.

More preferably, the pressing portion has a window formed therein for making it possible to visually check the contact portion on the base portion.

Preferably, the contact further comprises a crimping portion that is continuous with the base portion and is crimped onto the other object to be connected.

To attain the above object, in a second aspect of the present invention, there is provided a connection unit comprising at least two contacts, and a housing that holds the at least two contacts, wherein the at least two contacts each comprise a base portion having a plate-like shape, with which a contact portion of an object to be connected is brought into contact, a pair of supporting portions that are provided on opposite side edges of the base portion in a manner rising therefrom, respectively, and are opposed to each other in a predetermined direction, the pair of supporting portions each having a slit formed therein for supporting a terminal portion of an electronic component, and a crimping portion that is continuous with the base portion and is crimped onto the other object to be connected.

To attain the above object, in a third aspect of the present invention, there is provided a connection unit, comprising at least one contact as recited in any one of claims 1 to 3, two contacts as recited in any one of claims 4 to 6, and a housing that holds these contacts, wherein the at least one contact as claimed in any one of claims 1 to 3 is arranged between the two contacts as claimed in any one of claims 4 to 6.

According to this invention, it is possible to reduce the size of the connection unit.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

A description will be given of a connection unit according to a first embodiment of the present invention with reference to FIGS. 1 to 13.

Figure 1:
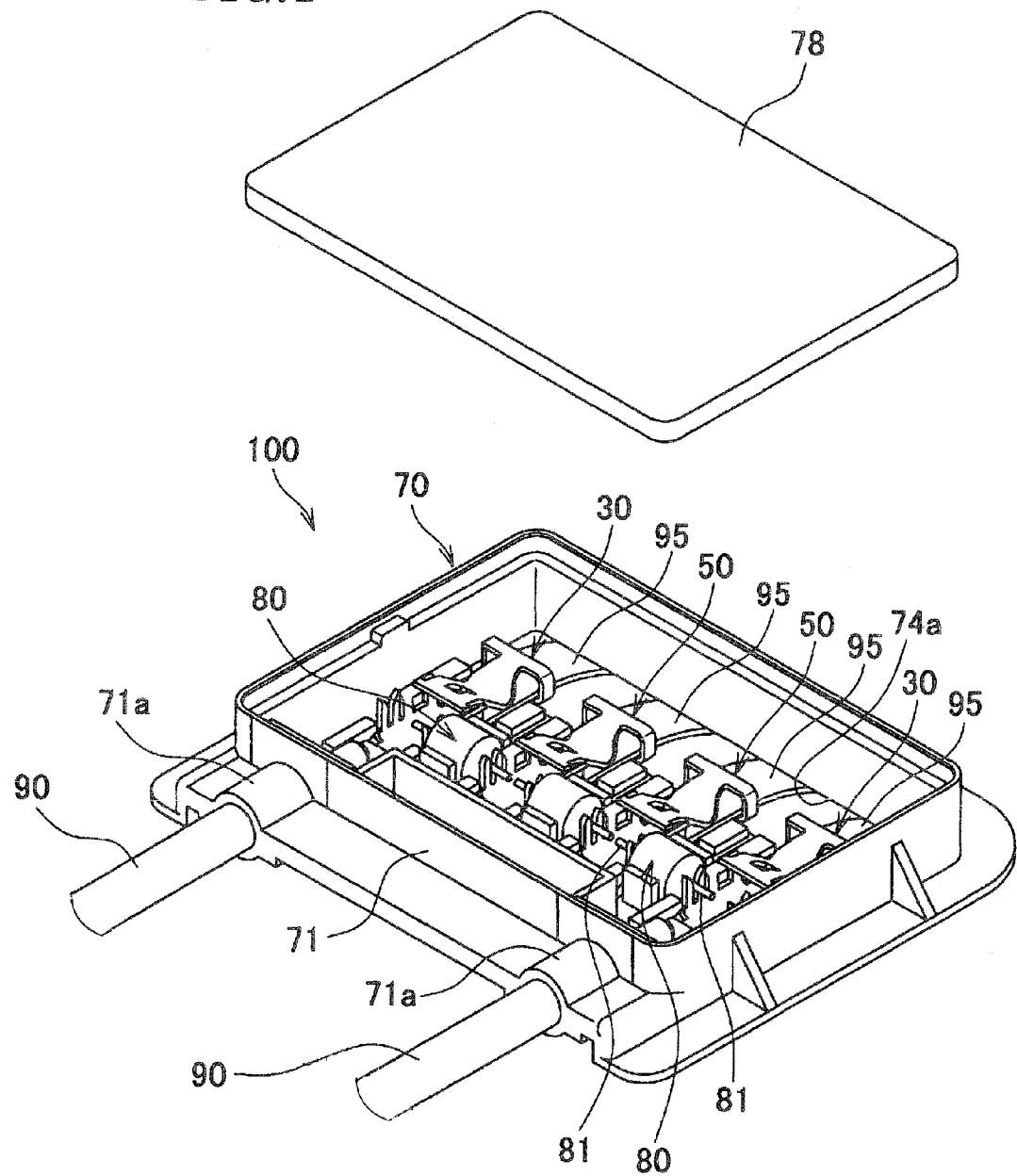
FIG. 1 is a perspective view of a connection unit according to a first embodiment of the present invention in a state in which a cover is removed from the connection unit.
Figure 2:
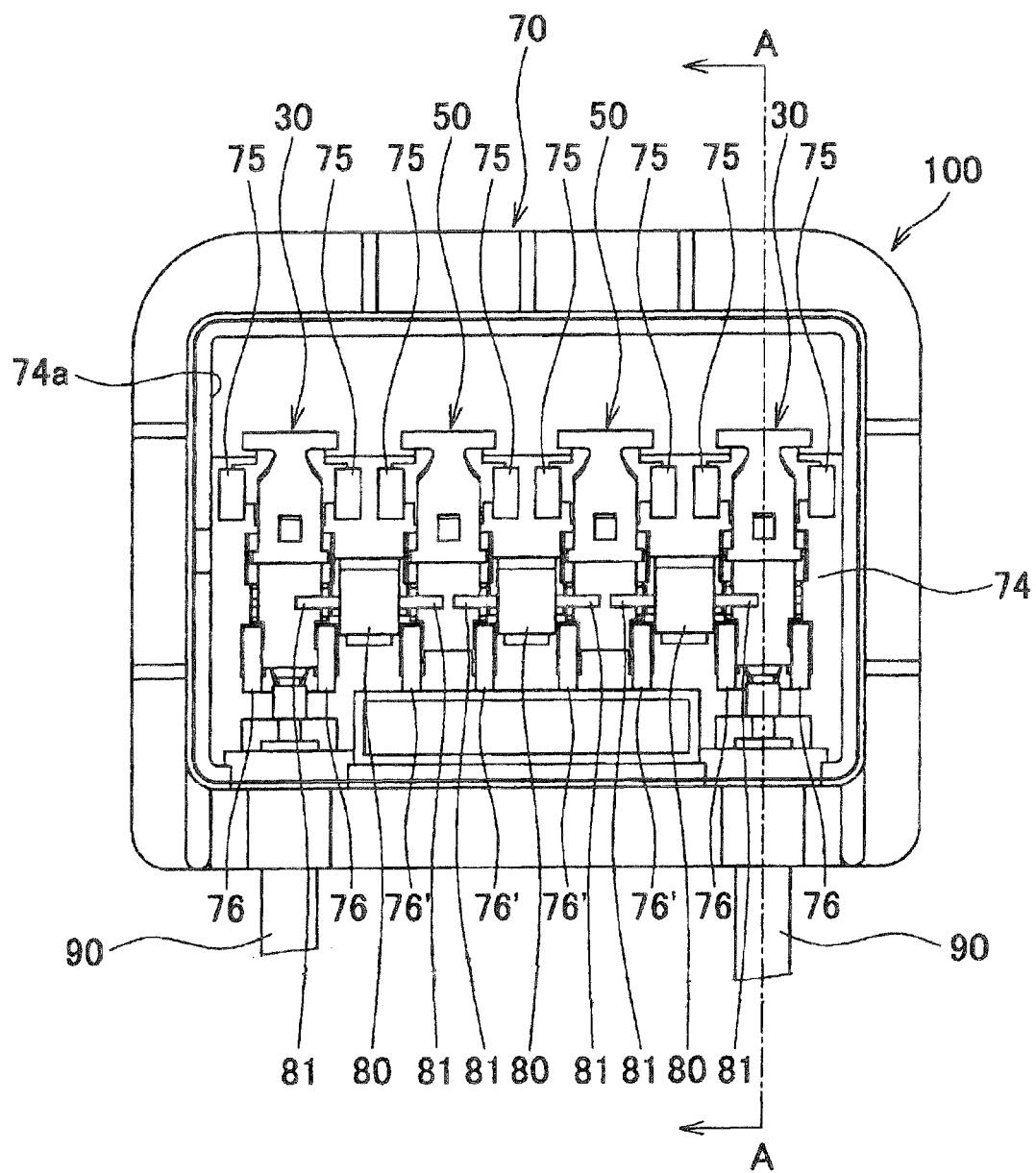
FIG. 2 is a plan view of the connection unit appearing in FIG. 1.
Figure 3:
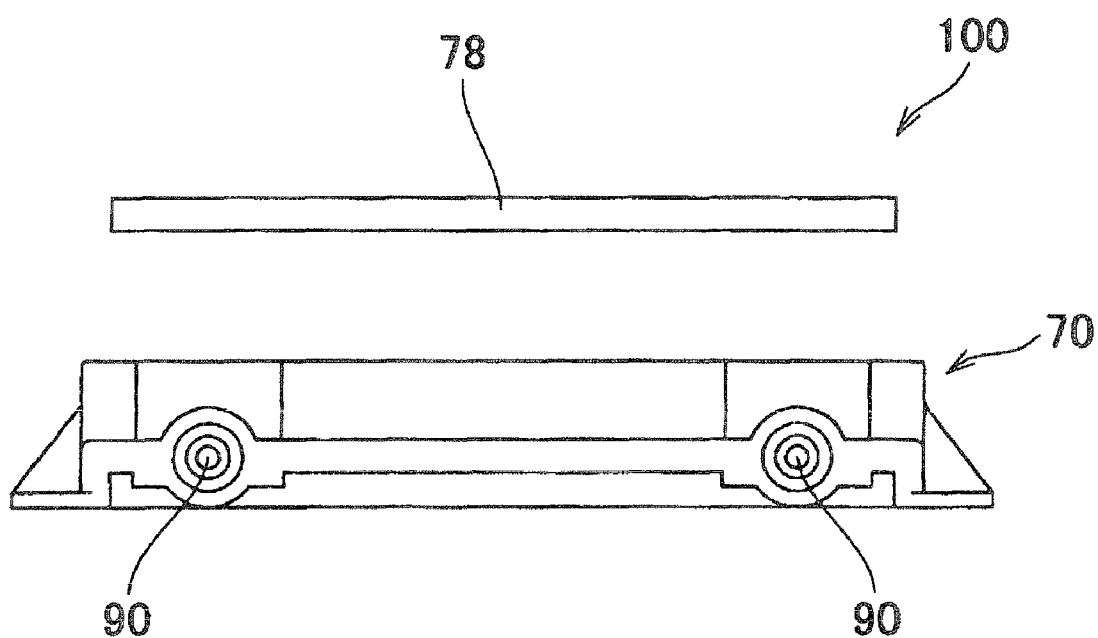
FIG. 3 is a front view of the connection unit appearing in FIG. 1.
Figure 4:
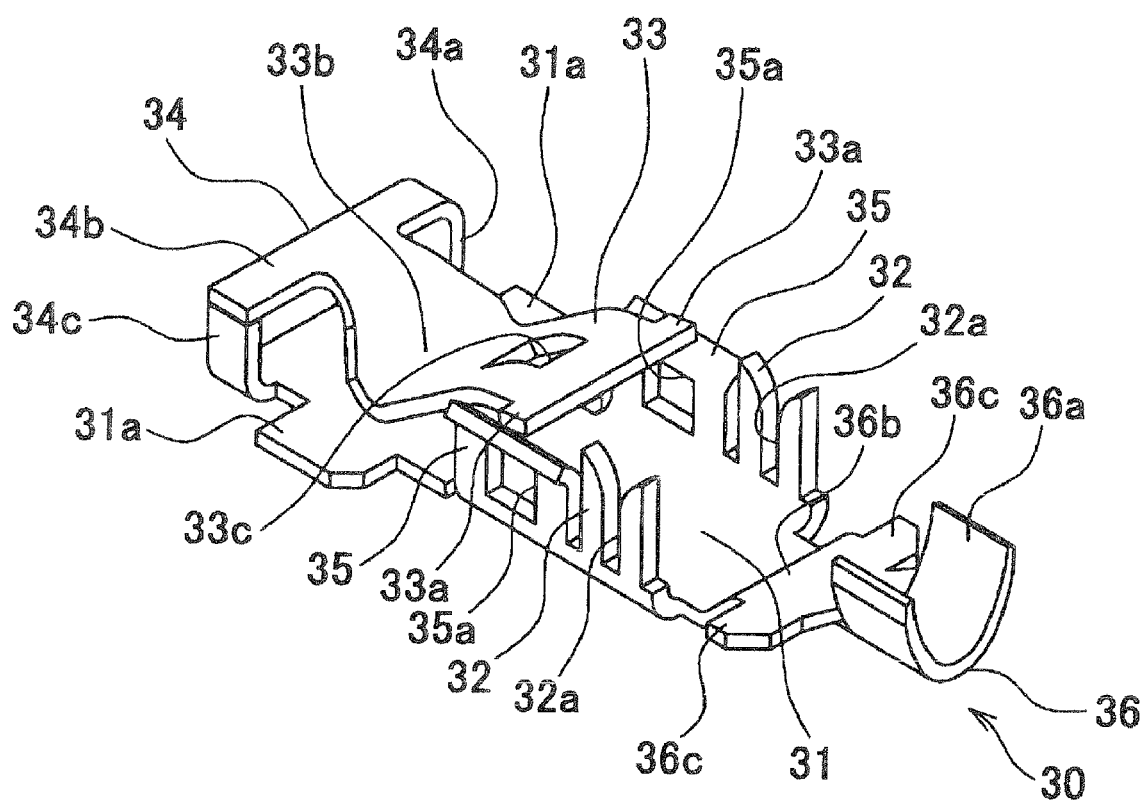
FIG. 4 is a perspective view of a first contact of the connection unit appearing in FIG. 1.
Figure 5:
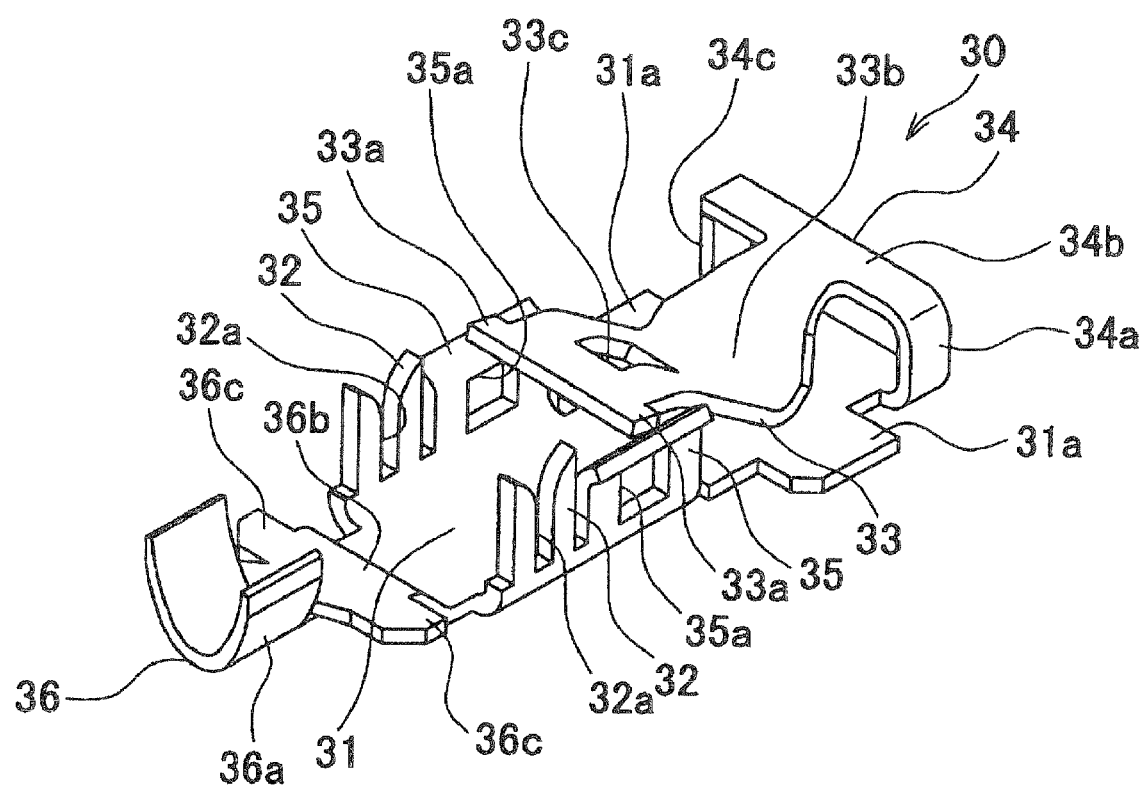
FIG. 5 is a perspective view of the first contact shown in FIG. 4 as taken from another angle.

As shown in FIGS. 1 to 3, a connection unit 100 comprises two first contacts 30, two second contacts 50, and a housing 70. The connection unit 100 is mounted on a reverse side of a photovoltaic module, not shown.

As shown in FIGS. 4 to 7, each first contact 30 includes a base portion 31, a pair of supporting portions 32, a pressing portion 33, a linking portion 34, a pair of engaging portions 35, and a crimping portion 36. The first contacts 30 and the second contacts 50 are each formed by blanking and bending a metal plate (see FIG. 8).

Figure 6:
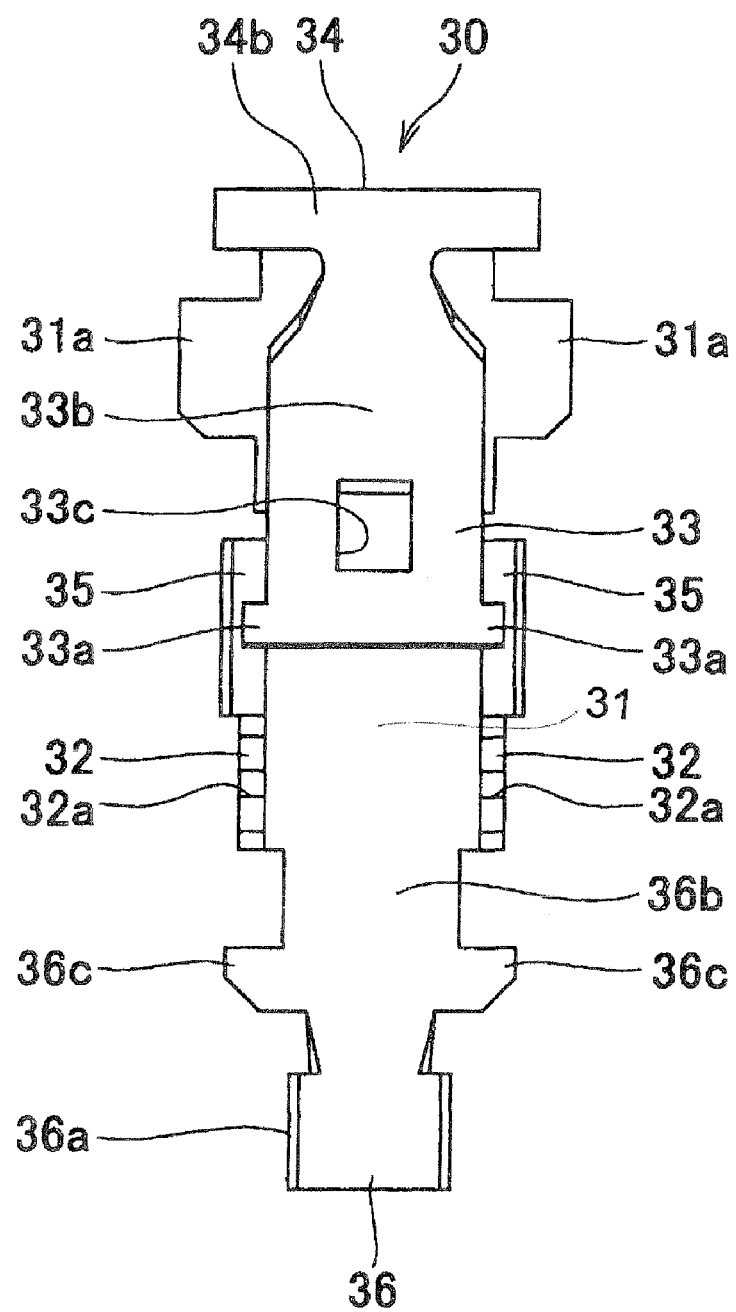
FIG. 6 is a plan view of the first contact shown in FIG. 4.
Figure 7:
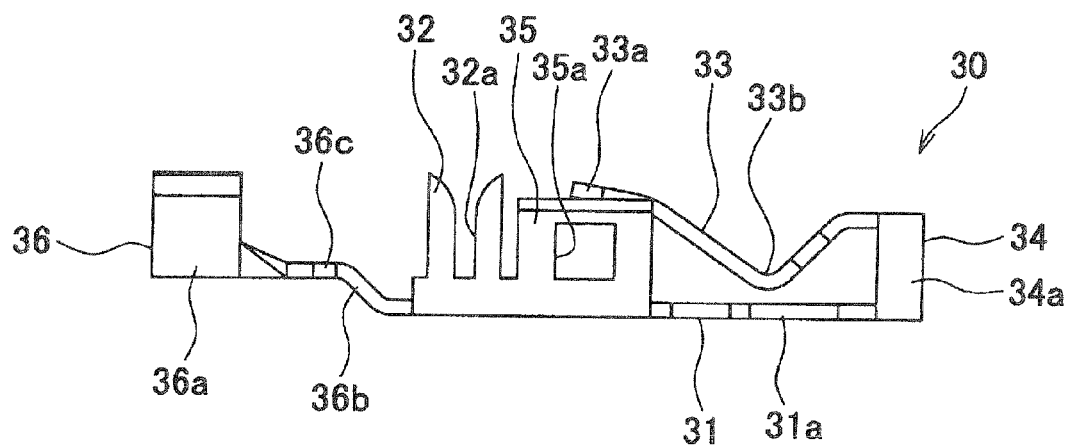
FIG. 7 is side view of the first contact shown in FIG. 4.
Figure 8:
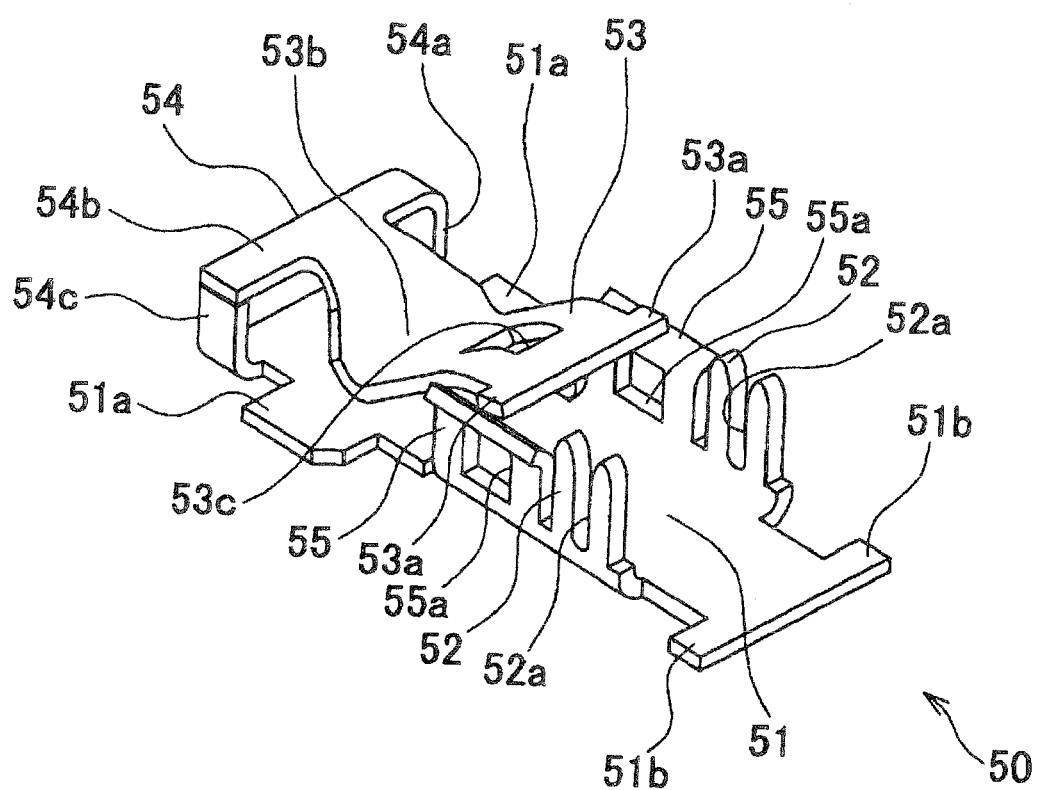
FIG. 8 is a perspective view of a second contact of the connection unit appearing in FIG. 1.
Figure 9:
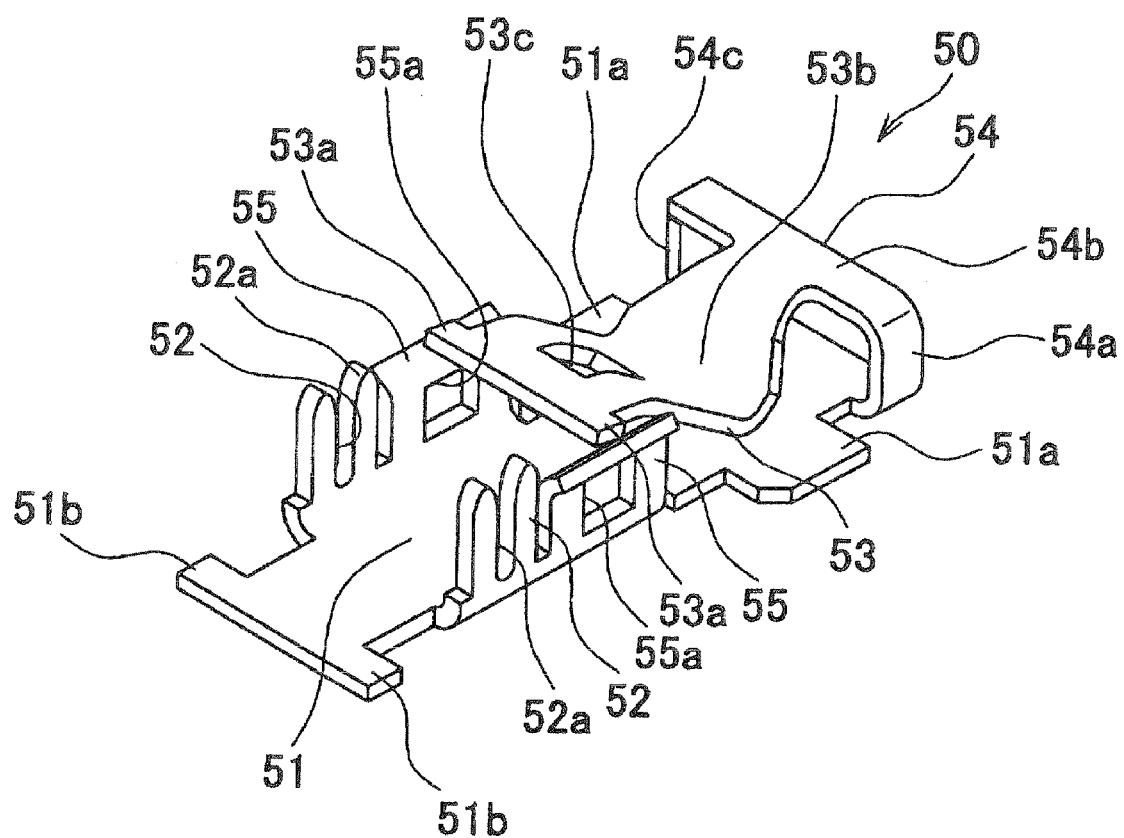
FIG. 9 is a perspective view of the second contact shown in FIG. 8 as taken from another angle.

The base portion 31 is plate-shaped. Press fitting pieces 31a are continuous with opposite side edges of a rear portion (the top and bottom sides as viewed in FIG. 6 are the rear and front of the first contact 30, respectively) of the base portion 31, respectively.

The pair of supporting portions 32 rise from opposite side edges of a front portion of the base portion 31, respectively. The direction of the thickness of each supporting portion 32 is substantially orthogonal to the direction of the thickness of the base portion 31, and further is substantially parallel to the direction of the arrangement of the first and second contacts 30 and 50. The supporting portions 32 are each formed with a slit 32a. The slit 32a extends in the direction of the thickness of the base portion 31.

The pressing portion 33 is plate-shaped, and is opposed to the base portion 31. One end of the pressing portion 33 is continuous with the linking portion 34. The pressing portion 33 is capable of being elastically deformed toward the base portion 31. Protruding pieces 33a are continuous with opposite side edges of the other end of the pressing portion 33, respectively. The other end of the pressing portion 33 is formed with a window 33c. An intermediate portion 33b of the pressing portion 33 is bent such that it becomes closer to the base portion 31.

The linking portion 34 links the pressing portion 33 to one end of the base portion 31. The linking portion 34 includes a first linking piece 34a, a second linking piece 34b, and a third linking piece 34c. The first linking piece 34a rises from one side edge of the one end of the base portion 31. The first linking piece 34a is substantially at right angles to the base portion 31. One end of the second linking piece 34b is continuous with an upper end of the first linking piece 34a. The second linking piece 34b is substantially at right angles to the first linking piece 34a. The third linking piece 34c rises from the other side edge of the one end of the base portion 31. The third linking piece 34c is substantially at right angles to the base portion 31. An upper end of the third linking piece 34c is brought into abutment with the other end of the second linking piece 34b.

The engaging portions 35 rise from the opposite side edges of the central portion of the base portion 31, respectively. The direction of the thickness of each engaging portion 35 is substantially orthogonal to the direction of the thickness of the base portion 31, and further is substantially parallel to the direction of the arrangement of the first and second contacts 30 and 50. The engaging portions 35 are each formed with a hole 35a.

The crimping portion 36 includes a crimping piece 36a, a linking piece 36b, and a pair of engaging pieces 36c. The crimping piece 36a is bent into a U-shape. The linking piece 36b links the crimping piece 36a to the base portion 31. The engaging pieces 36c are continuous with the opposite side edges of the linking piece 36b, respectively.

As shown in FIGS. 8 to 11, each second contact 50 includes a base portion 51, a pair of supporting portions 52, a pressing portion 53, a linking portion 54, and a pair of engaging portions 55.

Figure 10:
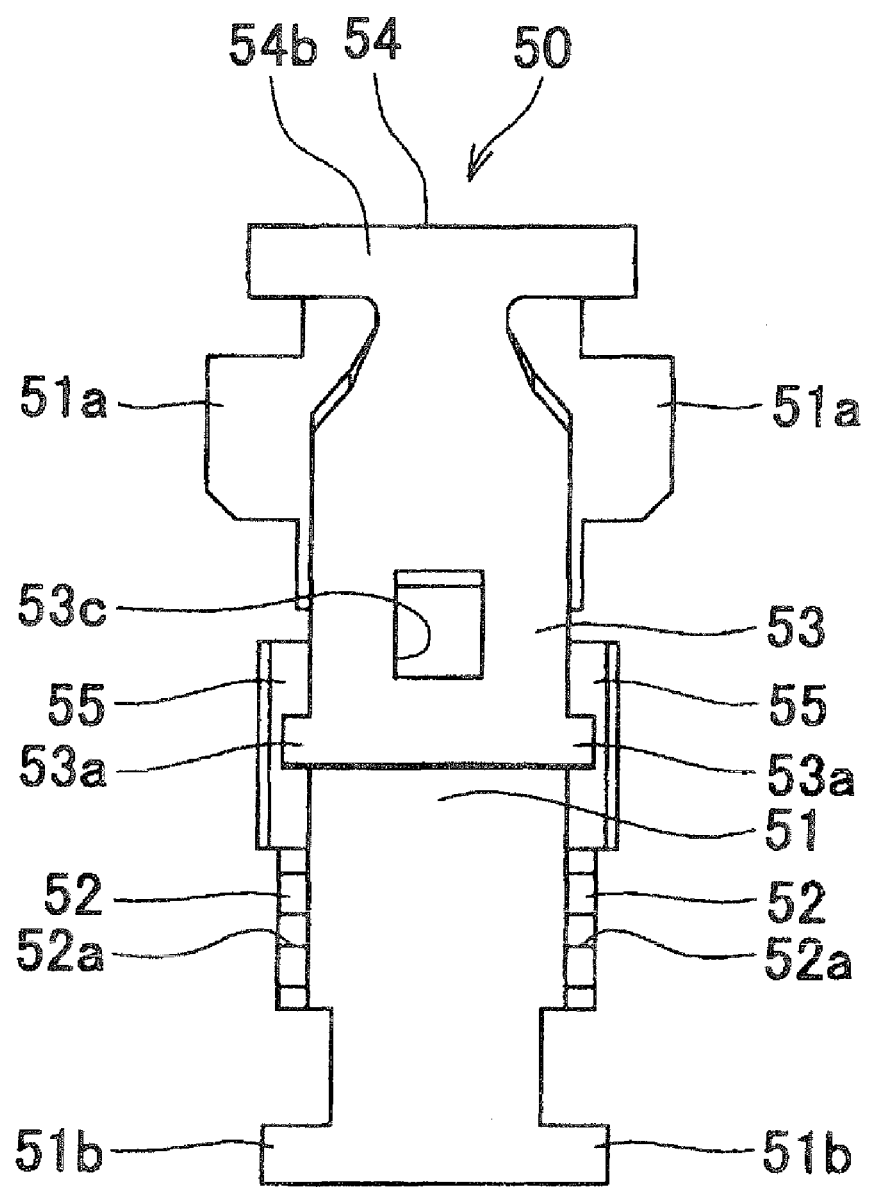
FIG. 10 is a plan view of the second contact shown in FIG. 8.
Figure 11:
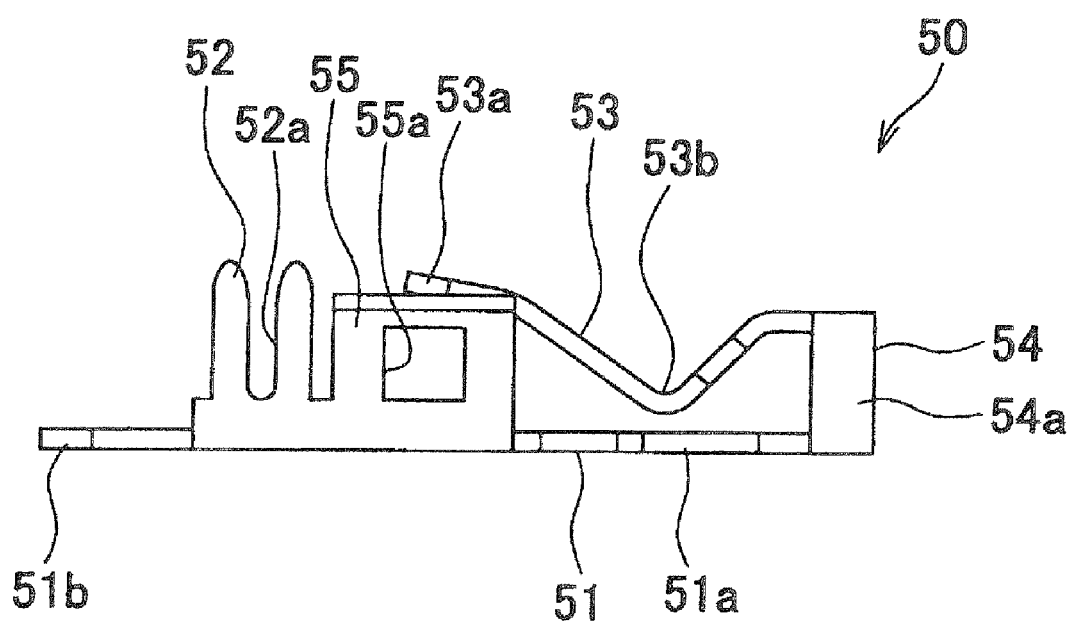
FIG. 11 is a side view of the second contact shown in FIG. 8.

The base portion 51 is plate-shaped. Press fitting pieces 51a are continuous with opposite side edges of a rear portion (the top and bottom sides as viewed in FIG. 10 are the rear and front of the second contact 50, respectively) of the base portion 51, respectively. Engaging pieces 51b are continuous with the opposite side edges of a front end of the base portion 51, respectively.

The pair of supporting portions 52 rise from the opposite side edges of a front portion of the base portion 51, respectively. The direction of the thickness of each supporting portion 52 is substantially orthogonal to the direction of the thickness of the base portion 51, and further is substantially parallel to the direction of the arrangement of the first and second contacts 30 and 50. The supporting portions 52 are each formed with a slit 52a. The slit 52a extends in the direction of the thickness of the base portion 51.

The pressing portion 53 is plate-shaped, and is opposed to the base portion 51. One end of the pressing portion 53 is continuous with the linking portion 54. The pressing portion 53 is capable of being elastically deformed toward the base portion 51. Protruding pieces 53a are continuous with the opposite side edges of the other end of the pressing portion 53. The other end of the pressing portion 53 is formed with a window 53c. An intermediate portion 53b of the pressing portion 53 is bent such that it becomes closer to the base portion 51.

The linking portion 54 links the pressing portion 53 to the one end of the base portion 51. The linking portion 54 includes a first linking piece 54a, a second linking piece 54b, and a third linking piece 54c. The first linking piece 54a rises from one side edge of the one end of the base portion 51. The first linking piece 54a is substantially at right angles to the base portion 51. One end of the second linking piece 54b is continuous with an upper end of the first linking piece 54a. The second linking piece 54b is substantially at right angles to the first linking piece 54a. The third linking piece 54c rises from the other side edge of the one end of the base portion 51. The third linking piece 54c is substantially at right angles to the base portion 51. An upper end of the third linking piece 54c is brought into abutment with the other end of the second linking piece 54b.

The engaging portions 55 rise from the opposite side edges of the central portion of the base portion 51, respectively. The direction of the thickness of each engaging portion 55 is substantially orthogonal to the direction of the thickness of the base portion 51, and further is substantially parallel to the direction of the arrangement of the first and second contacts 30 and 50. The engaging portions 55 are each formed with a hole 55a.

Figure 12:
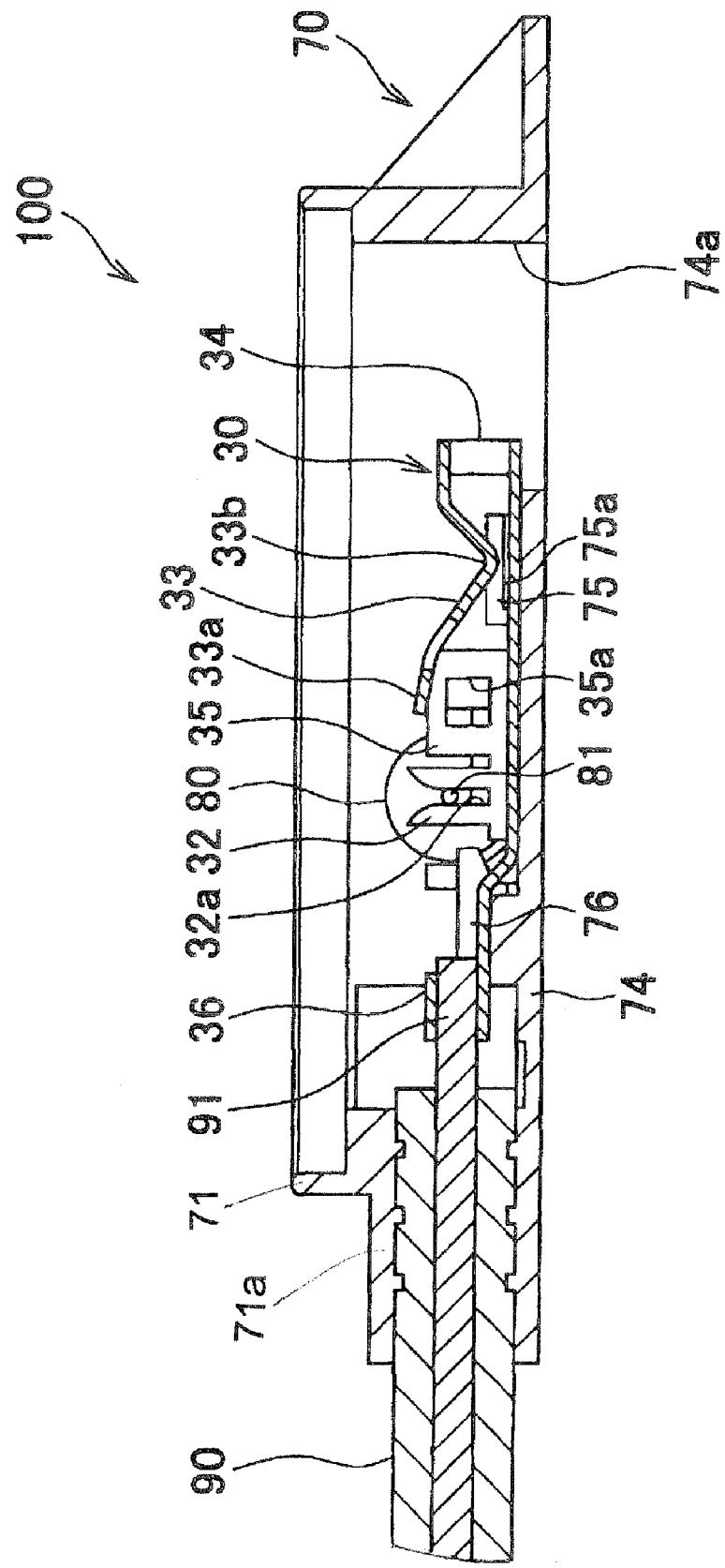
FIG. 12 is a cross-sectional view taken along A-A in FIG. 2 when the other end of the first contact is not engaged with an engaging portion.

The housing 70 shown in FIG. 1 is integrally formed of an insulating material. As shown in FIGS. 1 to 3, the housing 70 has a box shape that opens upward (the top and bottom sides and the left and right sides as viewed in FIG. 12 are the top and bottom and the front and rear of the housing 70, respectively). The opening of the housing 70 is covered by a lid 78. An insertion hole 74a is formed in a rear portion of a bottom portion 74 of the housing 70. Further, a plurality of protrusions 75 are arranged at predetermined intervals on the rear portion of the bottom portion 74. A front portion of each protrusion 75 is continuous with the bottom portion 74. A space 75a is formed under a rear portion and a central portion of each protrusion 75 (see FIG. 12). A plurality of hooking portions 76 and 76' are arranged at predetermined intervals on a front portion of the bottom portion 74 (see FIG. 2). A front portion of each of the hooking portions 76 and 76' is continuous with the bottom portion 74.

Figure 13:
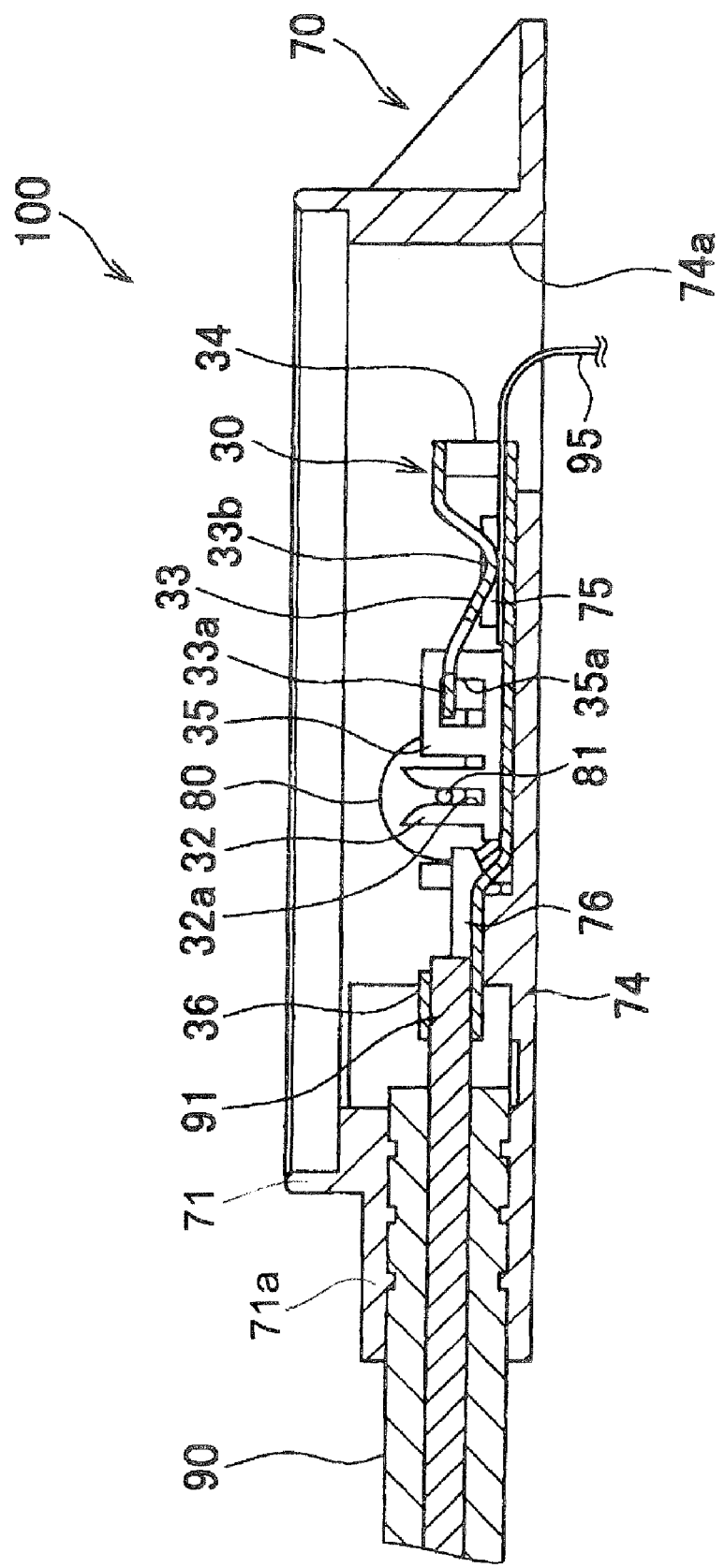
FIG. 13 is a cross-sectional view taken along A-A in FIG. 2 when the other end of the first contact is engaged with the engaging portion.

The housing 70 has a front portion 71 formed with two hollow cylindrical insertion portions 71a (see FIGS. 1, 12, and 13).

Next, a description will be given of how the connection unit 100 is used.

First, the first contacts 30 to which cables (the other objects to be connected) 90 are connected, respectively, are received in the housing 70 and are fixed thereto, and the second contacts 50 are received in the housing 70 and are fixed thereto.

To connect each cable 90 to an associated one of the first contacts 30, a conductor 91 of one end of each cable 90 is exposed, the one end of the cable 90 is inserted into the housing 70 via an associated one of the insertion portions 71a, and the conductor 91 is placed on the crimping piece 36a of the associated one of the first contacts 30. Then, the crimping piece 36a is bent to thereby cause the same to hold the conductor 91 (see FIG. 12).

To fix the first and second contacts 30 and 50 to the housing 70, the press fitting pieces 31a and 51a of the first and second contacts 30 and 50 are inserted into the spaces 75a under the protrusions 75, respectively, and at the same time, the engaging pieces 36c of each first contact 30 are hooked to the hooking portions 76, respectively, and the engaging pieces 51b of each second contact 50 are hooked to the hooking portions 76' (see FIG. 2), respectively.

Next, diodes 80 are arranged, as shown in FIG. 2, between the first contact 30 located at a left end (left end as viewed in FIG. 2) and the second contact 50 adjacent thereto, between the two second contacts 50 and 50 at a central portion of the housing 70, and between the first contact 30 located at a right end and the second contact 50 adjacent thereto, respectively.

When the diode 80 is arranged between the first contact 30 located at the left end and the adjacent second contact 50, one terminal portion 81 of the diode 80 is inserted in the slit 32a of an associated one of the supporting portions 32 of the first contact 30, and the other terminal portion 81 of the diode 80 is inserted in the slit 52a of an associated one of the supporting portions 52 of the second contact 50. By doing this, the diode 80 located at the left end is electrically connected to the first contact 30 and the second contact 50 on both sides thereof.

When the diode 80 is arranged between the two second contacts 50 and 50 on the central portion of the housing 70, one terminal portion 81 of the diode 80 is inserted in the slit 52a of an associated one of the supporting portions 52 of the second contact 50 located on the left side, and the other terminal portion 81 of the diode 80 is inserted in the slit 52a of an associated one of the supporting portions 52 of the second contact 50 located on the right side. By doing this, the central diode 80 is electrically connected to the second contacts 50 located on both sides thereof.

When the diode 80 is arranged between the first contact 30 located at the right end and the adjacent second contact 50, one terminal portion 81 of the diode 80 is inserted in the slit 52a of an associated one of the supporting portions 52 of the second contact 50, and the other terminal portion 81 of the diode 80 is inserted in the slit 32a of an associated one of the supporting portions 32 of the first contact 30. By doing this, the diode 80 located at the right end is electrically connected to the first contact 30 and the second contact 50 located on both sides thereof.

Next, four electrodes 95 (having photovoltaic module-side diodes, not shown, connected thereto, respectively) are connected to the first and second contacts 30 and 50. Before performing the connection operation, the protruding pieces 33a of the pressing portion 33 of each first contact 30 are removed from the holes 35a of the engaging portions 35 (see FIG. 5), respectively. Similarly, the protruding pieces 53a of the pressing portion 53 of each second contact 50 are removed from the holes 55a of the engaging portions 55 (see FIG. 9), respectively.

To connect the four electrodes 95 (see FIG. 1), to the first and second contacts 30 and 50, first, the four electrodes 95 are inserted into the housing 70 through the insertion hole 74a (see FIGS. 2 and 13) of the housing 70.

Next, each electrode 95 is inserted between the base portion 31 and the pressing portion 33 of an associated one of the first contacts 30, or between the base portion 51 and the pressing portion 53 of an associated one of the second contacts 50.

Thereafter, the other end of the pressing portion 33 of the first contact 30 is pressed to thereby insert the protruding pieces 33a of the pressing portion 33 into the holes 35a of the engaging portions 35 (see FIG. 13), respectively. By doing this, the intermediate portion 33b of the pressing portion 33 presses the electrode 95 against the base portion 31, whereby the electrode 95 is electrically connected to the associated first contact 30.

Similarly, the other end of the pressing portion 53 of each second contact 50 is pressed to thereby insert the protruding pieces 53a of the pressing portion 53 into the holes 55a of the engaging portions 55, respectively. By doing this, the intermediate portion 53b of the pressing portion 53 presses the electrode 95 against the base portion 51, whereby the electrode 95 is electrically connected to the associated second contact 50.

Finally, the housing 70 is fixed to the reverse side of the photovoltaic module, and then, the lid 78 is mounted on the housing 70.

According to the above-described embodiment, the first and second contacts 30 and 50 respectively comprise the plate-shaped base portions 31 and 51 with which the electrodes 95 of the photovoltaic module are brought into contact, and the pairs of supporting portions 32 and 52 which are provided on the opposite side edges of the base portions 31 and 51 in a rising manner, respectively, and each pair of which are opposed to each other in a predetermined direction. The first and second contacts 30 and 50 support the terminal portions 81 of the diode 80 by the slits 32a and 52a formed in the pairs of supporting portions 32 and 52, respectively, and hence it is possible to reduce the width of the first and second contacts 30 and 50. As a result, it is possible to reduce the width of the connection unit 100 having the construction in which the plurality of first and second contacts 30 and 50 are arranged in the housing 70.

Further, the one ends of the pressing portions 33 and 53 of the first and second contacts 30 and 50 are linked to the linking portions 34 and 54, respectively, and the other ends of the pressing portions 33 and 53 are operated as operation portions to cause the pressing portions 33 and 53 to be elastically deformed, to thereby press the electrodes 95 against the base portions 31 and 51 by the intermediate portions 33b and 53b of the pressing portions 33 and 53, respectively. Therefore, it is possible to operate the pressing portions 33 and 53 by small force by virtue of the principle of leverage.

Further, the positions of the electrodes 95 can be checked through the windows 33c and 53c formed in the pressing portions 33 and 53, respectively, and hence it is possible to easily perform the operation for inserting the electrodes 95 between the base portions 31 and 51 and the pressing portions 33 and 53, respectively.

Next, a description will be given of a connection unit according to a second embodiment of the present invention with reference to FIGS. 14 and 15. Component parts identical to those of the connection unit according to the above-described first embodiment are denoted by identical reference numerals, and detailed description thereof is omitted.

The arrangement of pressing portions 233 and 253 and linking portions 234 and 254 of respective first and second contacts 230 and 250 of the second embodiment is different from that of the pressing portions 33 and 53 and the linking portions 34 and 54 of the respective first and second contacts 30 and 50 of the first embodiment. Except for this different point, the first embodiment and the second embodiment have the same arrangement.

Figure 14:
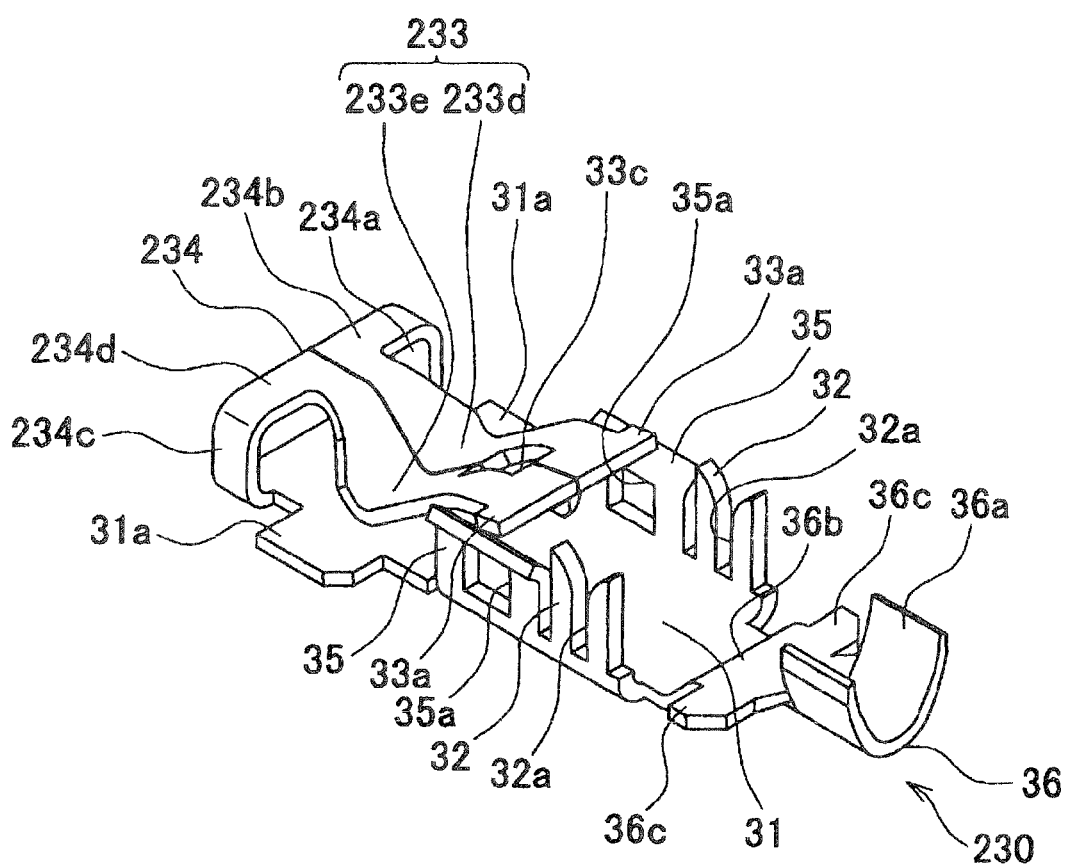
FIG. 14 is a perspective view of a first contact of a connection unit according to a second embodiment of the present invention.

As shown in FIG. 14, the pressing portion 233 of the first contact 230 is formed by a first pressing piece 233d and a second pressing piece 233e. The first pressing piece 233d and the second pressing piece 233e correspond to pieces formed by dividing the pressing portion 33 of the first embodiment in a horizontal direction (predetermined direction).

The linking portion 234 is formed by a first linking piece 234a, a second linking piece 234b, a third linking piece 234c, and a fourth linking piece 234d.

The first linking piece 234a rises from one side edge of the one end of the base portion 31. The first linking piece 234a is substantially at right angles to the base portion 31. One end of the second linking piece 234b is continuous with an upper end of the first linking piece 234a. The second linking piece 234b is substantially at right angles to the first linking piece 234a. The first pressing piece 233d is continuous with the second linking piece 234b. The third linking piece 234c rises from the other side edge of the one end of the base portion 31. The third linking piece 234c is substantially at right angles to the base portion 31. One end of the fourth linking piece 234d is continuous with an upper end of the third linking piece 234c. The fourth linking piece 234d is substantially at right angles to the third linking piece 234c. The other end of the fourth linking piece 234d is brought into abutment with the other end of the second linking piece 234b. The second pressing piece 233e is continuous with the fourth linking piece 234d.

Figure 15:
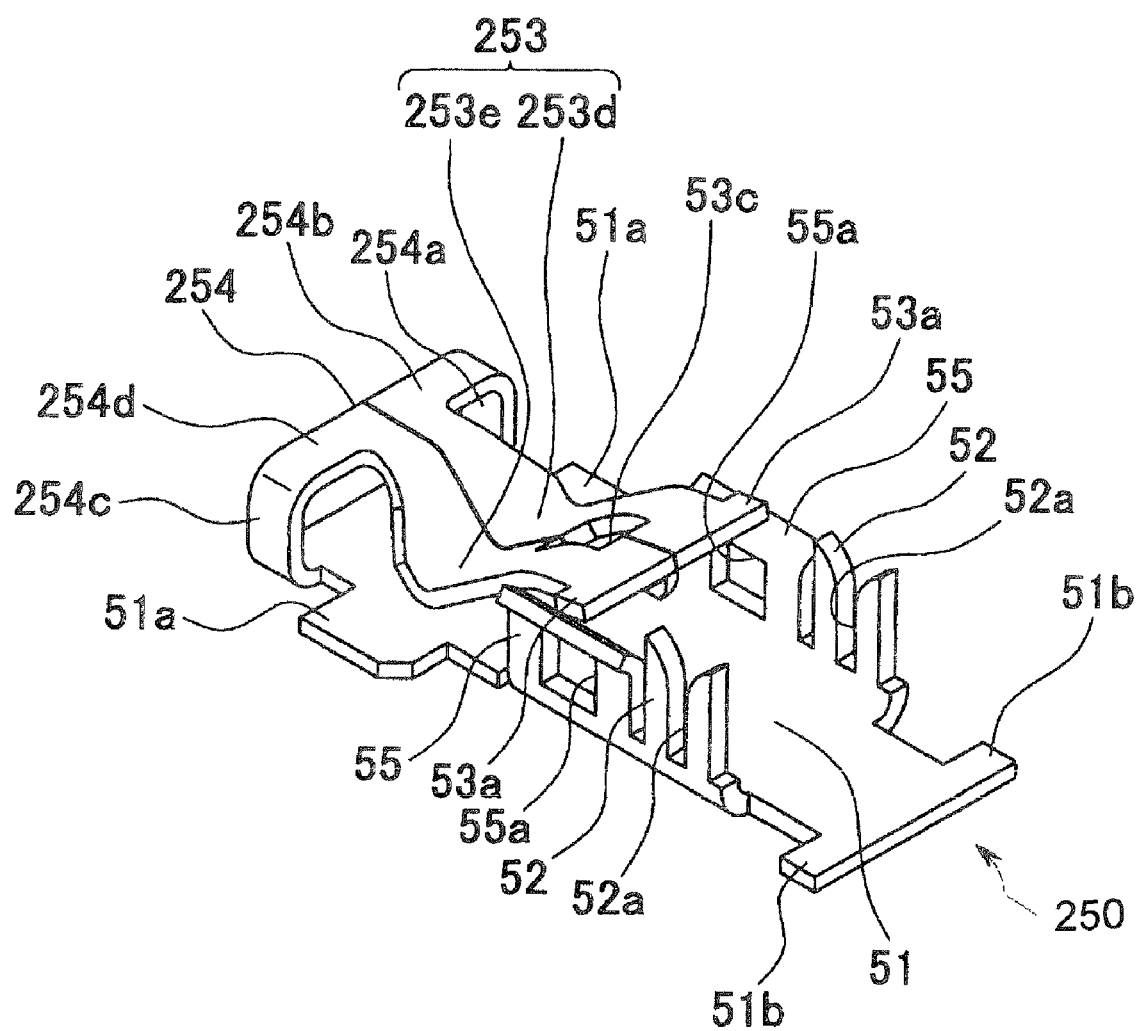
FIG. 15 is a perspective view of a second contact of the connection unit according to the second embodiment of the present invention.

As shown in FIG. 15, the pressing portion 253 of the second contact 250 is formed by a first pressing piece 253d and a second pressing piece 253e. The first pressing piece 253d and the second pressing piece 253e correspond to pieces formed by dividing the pressing portion 53 of the first embodiment in a horizontal direction (predetermined direction).

The linking portion 254 is formed by a first linking piece 254a, a second linking piece 254b, a third linking piece 254c, and a fourth linking piece 254d.

The first linking piece 254a rises from one side edge of the one end of the base portion 51. The first linking piece 254a is substantially at right angles to the base portion 51. One end of the second linking piece 254b is continuous with an upper end of the first linking piece 254a. The second linking piece 254b is substantially at right angles to the first linking piece 254a. The first pressing piece 253d is continuous with the second linking piece 254b. The third linking piece 254c rises from the other side edge of the one end of the base portion 51. The third linking piece 254c is substantially at right angles to the base portion 51. One end of the fourth linking piece 254d is continuous with an upper end of the third linking piece 254c. The fourth linking piece 254d is substantially at right angles to the third linking piece 254c. The other end of the fourth linking piece 254d is brought into abutment with the other end of the second linking piece 254b. The second pressing piece 253e is continuous with the fourth linking piece 254d.

According to the second embodiment, it is possible to obtain the same advantageous effects as provided by the first embodiment, and at the same time, the pressing portions 233 and 253 of the first and second contacts 230 and 250 are each formed with two contacts for an associated one of the electrodes 95, which improves the contact stability.

It should be noted that although in the above-described embodiments, the windows 33c and 53c are formed in the pressing portions 33 and 233, and 53 and 253, the windows 33c and 53c may be omitted.

Further, although in the above-described embodiments, the housing 70 accommodates two first contacts 30 and 30 and two second contacts 50 and 50 (or two first contacts 230 and 230 and two second contacts 250 and 250), there is a case in which the housing 70 accommodates only two first contacts 30 and 30 (or two first contacts 230 and 230) depending on the number of electrodes 95 of the photovoltaic module. Further, a connection unit may be constructed as required by combining the first and second contacts 30 and 50 of the first embodiment and the first and second contacts 230 and 250 of the second embodiment.

Further, although the connection units according to the above-described embodiments are those for the photovoltaic module, the connection unit according to the present invention is not limited to those for the photovoltaic module. Therefore, the electronic components arranged within the housing 70 are not limited to the diodes.

It is further understood by those skilled in the art that the foregoing are the preferred embodiments of the present invention, and that various changes and modification may be made thereto without departing from the spirit and scope thereof.

What is claimed is:

1. A contact comprising:
    a base portion having a plate-like shape, with which a contact portion of an object to be connected is brought into contact;
    a pair of supporting portions which are provided on respective opposite side edges of said base portion in a manner rising therefrom and which are opposed to each other in a predetermined direction, said pair of supporting portions each having a slit formed therein for supporting a terminal portion of an electronic component;
    a pressing portion that is provided in a manner opposed to said base portion, and that is elastically deformable toward said base portion to thereby press the contact portion against said base portion;
    a linking portion that links one end of said base portion and one end of said pressing portion; and
    engaging portions with which the other end of said pressing portion is engaged when said pressing portion is elastically deformed toward said base portion, to thereby cause said pressing portion to maintain the deformed state thereof;
    wherein said pressing portion is bent such that an intermediate portion thereof is brought into contact with the contact portion on said base portion when said pressing portion is elastically deformed toward said base portion, and
    wherein said pressing portion is divided along a direction orthogonal to the predetermined direction.

2. The contact as claimed in claim 1, wherein said pressing portion has a window formed therein for making it possible to visually check the contact portion on said base portion.

3. The contact as claimed in claim 2, further comprising a crimping portion that is continuous with said base portion and is crimped onto the object to be connected.

4. The contact as claimed in claim 1, further comprising a crimping portion that is continuous with said base portion and is crimped onto the object to be connected.

5. A connection unit comprising:
    two contacts according to claim 4;
    at least one additional contact including a plate-like base portion with which a contact portion of an object to be connected is brought into contact, and a pair of supporting portions which are provided on respective opposite side edges of said base portion in a manner rising therefrom and which are opposed to each other in a predetermined direction, said pair of supporting portions each having a slit formed therein for supporting a terminal portion of an electronic component; and
    a housing that holds said at least one additional contact and said two contacts;
    wherein said at least one additional contact is disposed between said two contacts.

6. A connection unit comprising:
    at least two contacts; and
    a housing that holds said at least two contacts;
    wherein each of said at least two contacts comprises:
        a base portion having a plate-like shape, with which a contact portion of an object to be connected is brought into contact;
        a pair of supporting portions which are provided on respective opposite side edges of said base portion in a manner rising therefrom and which are opposed to each other in a predetermined direction, said pair of supporting portions each having a slit formed therein for supporting a terminal portion of an electronic component;
        a crimping portion that is continuous with said base portion and is crimped onto the object to be connected;
        a pressing portion that is provided in a manner opposed to said base portion, and that is elastically deformable toward said base portion to thereby press the contact portion against said base portion;
        a linking portion that links one end of said base portion and one end of said pressing portion; and
        engaging portions with which the other end of said pressing portion is engaged when said pressing portion is elastically deformed toward said base portion, to thereby cause said pressing portion to maintain the deformed state thereof;
    wherein said pressing portion is bent such that an intermediate portion thereof is brought into contact with the contact portion on said base portion when said pressing portion is elastically deformed toward said base portion, and
    wherein said pressing portion is divided along a direction orthogonal to the predetermined direction.

7. The connection unit according to claim 6, wherein said pressing portion has a window formed therein for making it possible to visually check the contact portion on said base portion.

8. A connection unit comprising:
    two contacts according to claim 3;
    at least one additional contact including a plate-like base portion with which a contact portion of an object to be connected is brought into contact, and a pair of supporting portions which are provided on respective opposite side edges of said base portion in a manner rising therefrom and which are opposed to each other in a predetermined direction, each of said pair of supporting portions having a slit formed therein for supporting a terminal portion of an electronic component; and
    a housing that holds said at least one additional contact and said two contacts;
    wherein said at least one additional contact is disposed between said two contacts.

9. A connection unit comprising:
    two contacts, each of said two contacts comprising:
        a base portion having a plate-like shape, with which a contact portion of an object to be connected is brought into contact;
        a pair of supporting portions which are provided on respective opposite side edges of said base portion in a manner rising therefrom and which are opposed to each other in a predetermined direction, said pair of supporting portions each having a slit formed therein for supporting a terminal portion of an electronic component; and a crimping portion that is continuous with said base portion and is crimped onto the object to be connected;

at least one additional contact including (i) a plate-like base portion with which a contact portion of an object to be connected is brought into contact, (ii) a pair of supporting portions which are provided on respective opposite side edges of said base portion in a manner rising therefrom and which are opposed to each other in a predetermined direction, said pair of supporting portions each having a slit formed therein for supporting a terminal portion of an electronic component, (iii) a pressing portion which is provided in a manner opposed to said base portion, and which is elastically deformable toward said base portion to thereby press the contact portion against said base portion, (iv) a linking portion which links one end of said base portion and one end of said pressing portion, and (v) engaging portions with which another end of said pressing portion is engaged when said pressing portion is elastically deformed toward said base portion, to thereby cause said pressing portion to maintain a deformed state thereof, wherein said pressing portion is bent such that an intermediate portion thereof is brought into contact with the contact portion on said base portion when said pressing portion is elastically deformed toward said base portion, and wherein said pressing portion is divided along a direction orthogonal to the predetermined direction; and a housing that holds said at least one additional contact and said two contacts;

wherein said at least one additional contact is disposed between said two contacts.

10. A connection unit comprising:

two contacts according to claim 4;

at least one additional contact including (i) a plate-like base portion with which a contact portion of an object to be connected is brought into contact, (ii) a pair of supporting portions which are provided on respective opposite side edges of said base portion in a manner rising therefrom and which are opposed to each other in a predetermined direction, said pair of supporting portions each having a slit formed therein for supporting a terminal portion of an electronic component, (iii) a pressing portion which is provided in a manner opposed to said base portion, and which is elastically deformable toward said base portion to thereby press the contact portion against said base portion, (iv) a linking portion which links one end of said base portion and one end of said pressing portion, and (v) engaging portions with which another end of said pressing portion is engaged when said pressing portion is elastically deformed toward said base portion, to thereby cause said pressing portion to maintain a deformed state thereof, wherein said pressing portion is bent such that an intermediate portion thereof is brought into contact with the contact portion on said base portion when said pressing portion is elastically deformed toward said base portion, and wherein said pressing portion is divided along a direction orthogonal to the predetermined direction; and a housing that holds said at least one additional contact and said two contacts;

wherein said at least one additional contact is disposed between said two contacts.

11. A connection unit comprising:

two contacts according to claim 3;

at least one additional contact including (i) a plate-like base portion with which a contact portion of an object to be connected is brought into contact, (ii) a pair of supporting portions which are provided on respective opposite side edges of said base portion in a manner rising therefrom and which are opposed to each other in a predetermined direction, said pair of supporting portions each having a slit formed therein for supporting a terminal portion of an electronic component, (iii) a pressing portion which is provided in a manner opposed to said base portion, and which is elastically deformable toward said base portion to thereby press the contact portion against said base portion, (iv) a linking portion which links one end of said base portion and one end of said pressing portion, and (v) engaging portions with which another end of said pressing portion is engaged when said pressing portion is elastically deformed toward said base portion, to thereby cause said pressing portion to maintain a deformed state thereof, wherein said pressing portion is bent such that an intermediate portion thereof is brought into contact with the contact portion on said base portion when said pressing portion is elastically deformed toward said base portion, and wherein said pressing portion is divided along a direction orthogonal to the predetermined direction; and a housing that holds said at least one additional contact and said two contacts;

wherein said at least one additional contact is disposed between said two contacts.

12. A connection unit comprising:

two contacts, each of said two contacts comprising:

a base portion having a plate-like shape, with which a contact portion of an object to be connected is brought into contact;

a pair of supporting portions which are provided on respective opposite side edges of said base portion in a manner rising therefrom and which are opposed to each other in a predetermined direction, said pair of supporting portions each having a slit formed therein for supporting a terminal portion of an electronic component; and a crimping portion that is continuous with said base portion and is crimped onto the object to be connected;

at least one additional contact including (i) a plate-like base portion with which a contact portion of an object to be connected is brought into contact, (ii) a pair of supporting portions which are provided on respective opposite side edges of said base portion in a manner rising therefrom, respectively, and which are opposed to each other in a predetermined direction, said pair of supporting portions each having a slit formed therein for supporting a terminal portion of an electronic component, (iii) a pressing portion which is provided in a manner opposed to said base portion, and which is elastically deformed toward said base portion to thereby press the contact portion against said base portion, (iv) a linking portion which links one end of said base portion and one end of said pressing portion, and (v) engaging portions with which another end of said pressing portion is engaged when said pressing portion is elastically deformed toward said base portion, to thereby cause said pressing portion to maintain a deformed state thereof, wherein said pressing portion is bent such that an intermediate portion thereof is brought into contact with the contact portion on said base portion when said pressing portion is elastically deformed toward said base portion, wherein said pressing portion is divided along a direction orthogonal to the predetermined direction, and wherein said pressing portion has a window formed therein for allowing the contact portion on said base portion to be visible; and a housing that holds said at least additional one contact and said two contacts;

wherein said at least one additional contact is disposed between said two contacts.

13. A connection unit comprising:

two contacts according to claim 4;

at least one additional contact including (i) a plate-like base portion with which a contact portion of an object to be connected is brought into contact, (ii) a pair of supporting portions which are provided on respective opposite side edges of said base portion in a manner rising therefrom and which are opposed to each other in a predetermined direction, said pair of supporting portions each having a slit formed therein for supporting a terminal portion of an electronic component, (iii) a pressing portion which is provided in a manner opposed to said base portion, and which is elastically deformable toward said base portion to thereby press the contact portion against said base portion, (iv) a linking portion which links one end of said base portion and one end of said pressing portion, and (v) engaging portions with which another end of said pressing portion is engaged when said pressing portion is elastically deformed toward said base portion, to thereby cause said pressing portion to maintain a deformed state thereof, wherein said pressing portion is bent such that an intermediate portion thereof is brought into contact with the contact portion on said base portion when said pressing portion is elastically deformed toward said base portion, wherein said pressing portion is divided along a direction orthogonal to the predetermined direction, and wherein said pressing portion has a window formed therein for allowing the contact portion on said base portion to be visible; and a housing that holds said at least one additional contact and said two contacts;

wherein said at least one additional contact is disposed between said two contacts.

14. A connection unit comprising:

two contacts according to claim 3;

at least one additional contact including (i) a plate-like base portion with which a contact portion of an object to be connected is brought into contact, (ii) a pair of supporting portions which are provided on respective opposite side edges of said base portion in a manner rising therefrom and which are opposed to each other in a predetermined direction, said pair of supporting portions each having a slit formed therein for supporting a terminal portion of an electronic component, (iii) a pressing portion which is provided in a manner opposed to said base portion, and which is elastically deformable toward said base portion to thereby press the contact portion against said base portion, (iv) a linking portion which links one end of said base portion and one end of said pressing portion, and (v) engaging portions with which another end of said pressing portion is engaged when said pressing portion is elastically deformed toward said base portion, to thereby cause said pressing portion to maintain a deformed state thereof, wherein said pressing portion is bent such that an intermediate portion thereof is brought into contact with the contact portion on said base portion when said pressing portion is elastically deformed toward said base portion, wherein said pressing portion is divided along a direction orthogonal to the predetermined direction, and wherein said pressing portion has a window formed therein for allowing the contact portion on said base portion to be visible; and a housing that holds said at least one additional contact and said two contacts;

wherein said at least one additional contact is disposed between said two contacts.

* * * * *